(No Model.) 4 Sheets—Sheet 2.
C. ADER.
TELEPHONIC TRANSMISSION OF SOUND FROM THEATERS.
No. 257,453. Patented May 9, 1882.
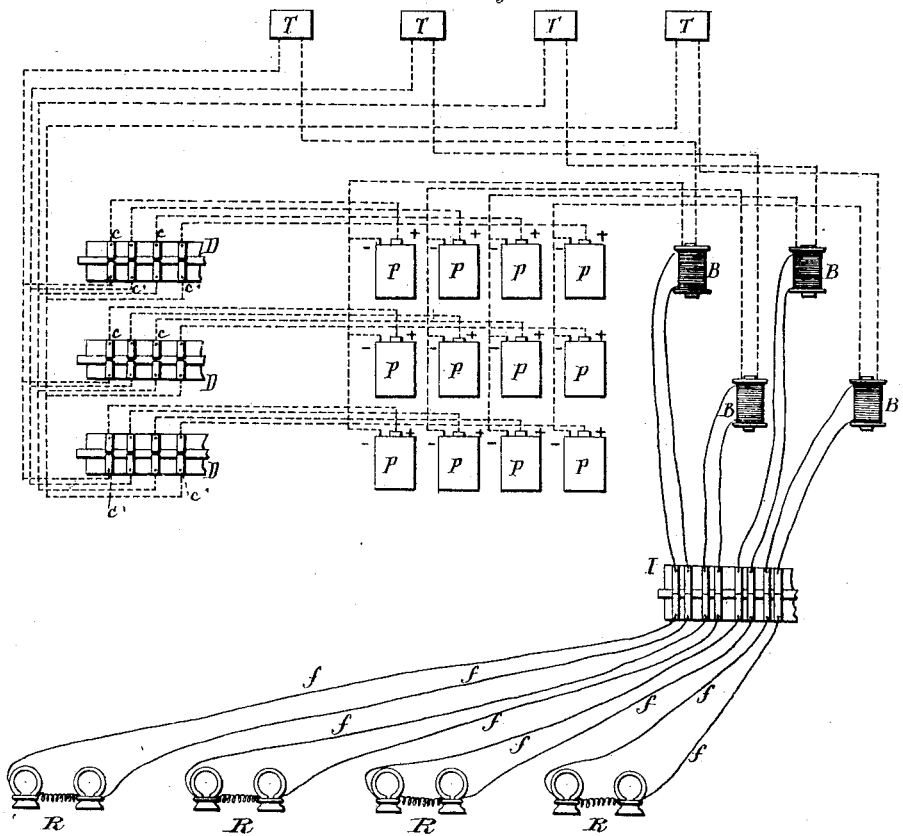
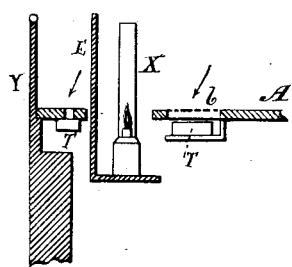
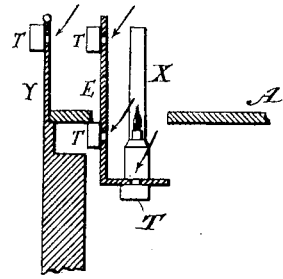
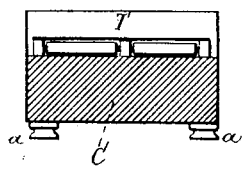
WITNESSES:
INVENTOR:

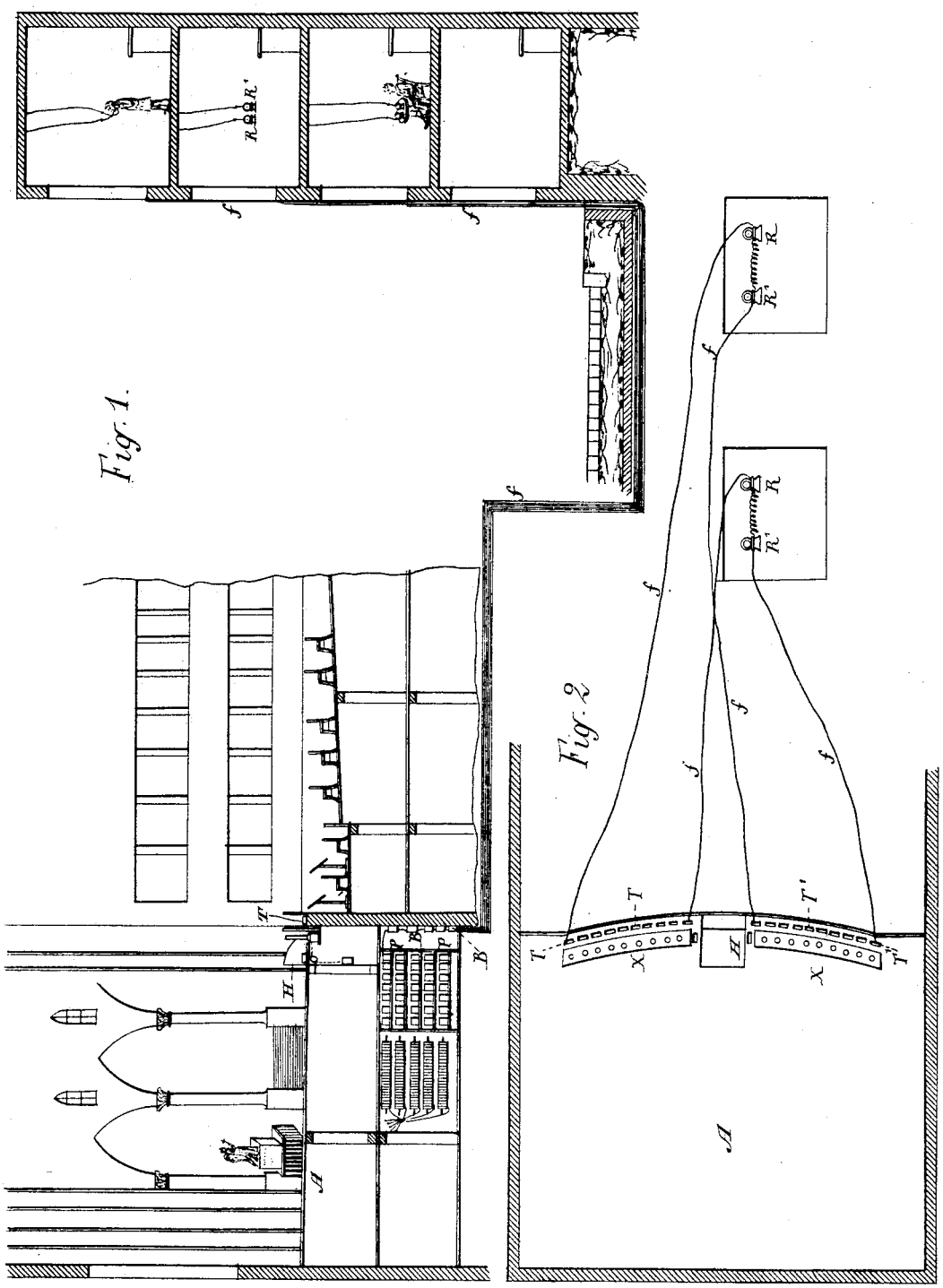

(No Model.) 4 Sheets—Sheet 3.
C. ADER.
TELEPHONIC TRANSMISSION OF SOUND FROM THEATERS.
No. 257,453. Patented May 9, 1882.

WITNESSES:
E. B. Bolton

INVENTOR:
Clement Ader
By his Attorneys.
Burke, Fraser & Connett (No Model.) 4 Sheets—Sheet 4.

C. ADER.
TELEPHONIC TRANSMISSION OF SOUND FROM THEATERS.

No. 257,453. Patented May 9, 1882.

WITNESSES:
E. B. Bolton
Geo Bainton

INVENTOR:
Clement Ader
By his Attorneys.
Burke, Fraser Connett

UNITED STATES PATENT OFFICE.

CLEMENT ADER, OF PARIS, FRANCE.

TELEPHONIC TRANSMISSION OF SOUND FROM THEATERS.

SPECIFICATION forming part of Letters Patent No. 257,453, dated May 9, 1882.

Application filed January 13, 1882. (No model.) Patented in France August 9, 1881, in Germany August 29, 1881, in Belgium August 29, 1881, in England September 1, 1881, and in Italy September 13, 1881.

*To all whom it may concern:*

Be it known that I, CLEMENT ADER, a citizen of the French Republic, residing in Paris, France, have invented certain Improvements in Means for the Telephonic Transmission of Sound from Theaters to Subscribers, of which the following is a specification.

My invention seeks to provide for the better telephonic transmission of speech, music, and singing from theaters, opera-houses, and lecture-halls than has heretofore been possible. To this end I place a series of transmitters on the stage in the vicinity of the foot-lights, each of these transmitters being arranged, as usual in a local circuit, with a battery and induction-coil and a line-circuit extending from each such coil to the houses of the respective subscribers. Two line-circuits extend to the house of each subscriber and there terminate in two receiving-telephones, one of which the auditor is to place at each ear. The receiver which he should place at his right ear is connected with a transmitter at the right of the stage, and the one which he should place at his left ear is connected with a transmitter at the left of the stage. It is well known that the sounds transmitted telephonically vary in strength according to the distance of their source from the transmitter. Hence when an actor or singer is at the right of the stage the sound heard by the auditor's right ear is the louder, and as he moves toward the left of the stage the sound heard by the auditor's left ear becomes the louder, while that heard by his right ear decreases. An effect is thus produced upon the ears akin to that which the stereoscope produces on the eyes, so that the auditor is enabled to follow the actor's movements about the stage, and thus receives a more intelligible impression of the performance than by the arrangement heretofore employed.

I will describe the remaining features of my invention with reference to the accompanying drawings, wherein—

Figure 7:
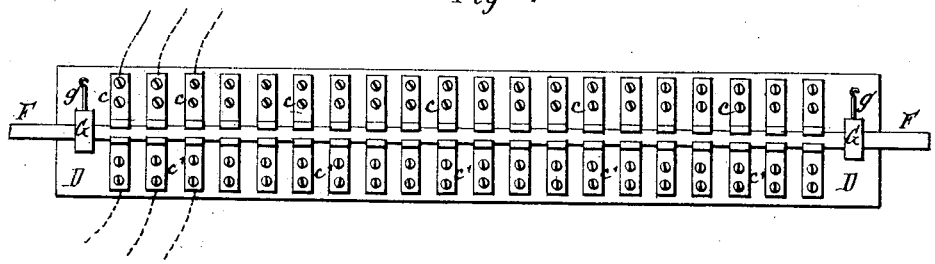
Figure 8:
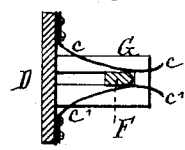
Figure 9:
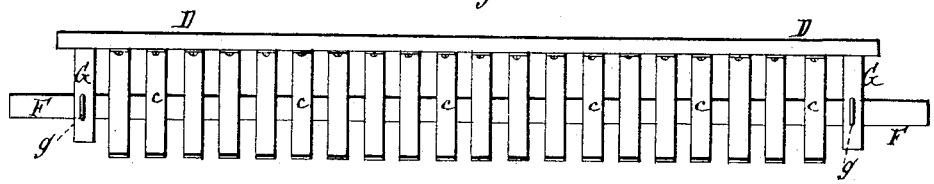
Figure 10:
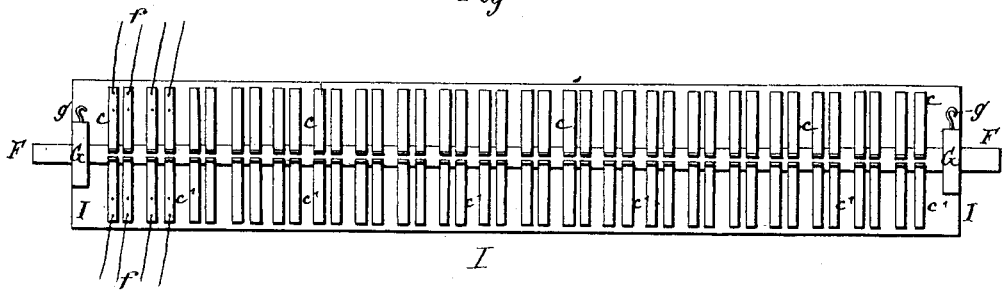
Figure 11:
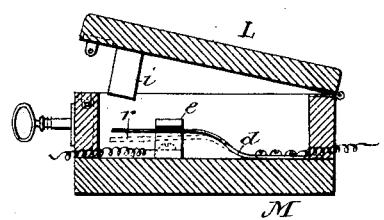
Figure 12:
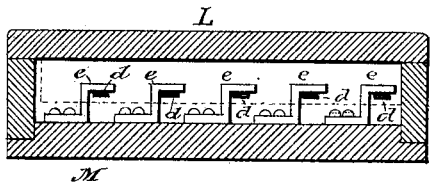
Figure 14:
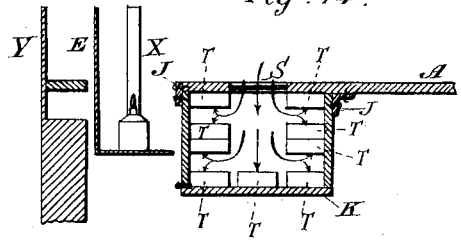
Figure 13:
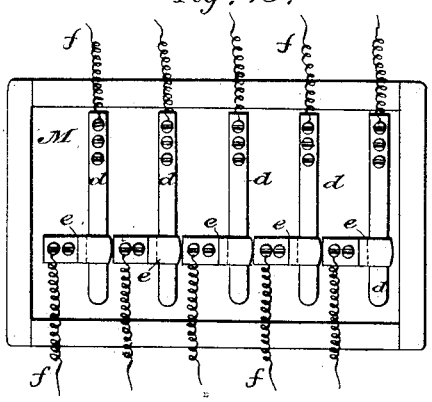
Figure 15:
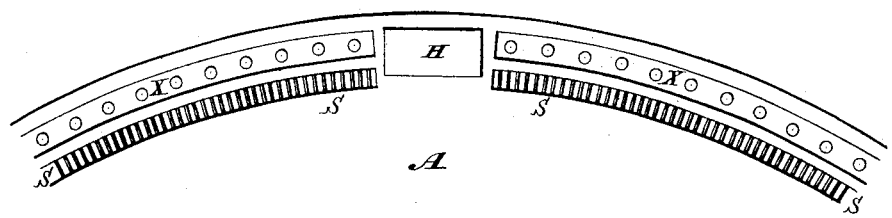

Figure 1 is a vertical mid-section of the stage of a theater and of the house of a subscriber. Fig. 2 is a plan of the same. Fig. 3 is a diagram showing a series of circuits with their connections and accessories. Fig. 4 is a vertical mid-section of the transmitter. Figs. 5 and 6 are transverse sections of the front portion of the stage and foot-lights, showing different ways of arranging the transmitters. Fig. 7 is a front view of a battery-commutator or series of shunts arranged for simultaneous operation. Fig. 8 is a vertical cross-section of the same. Fig. 9 is a plan thereof. Fig. 10 is a front elevation of a gang of circuit-interruptors arranged for simultaneous operation. Fig. 11 is a vertical transverse section of a silencing-box for each subscriber cut in the plane of the line 11 11 in Fig. 13. Fig. 12 is a longitudinal section thereof cut in the plane of the line 12 12 in Fig. 13. Fig. 13 is a plan thereof with the lid removed. Fig. 14 is a vertical section of the front portion of the stage and foot-lights, showing another method of arranging the transmitters; and Fig. 15 is a plan of the front of the stage.

I employ by preference a double wire for each line-circuit to avoid induction. The kind of transmitters and receivers employed is not essential; but I prefer to employ a receiver invented by me, and on which I have prepared an application for a United States patent.

In the drawings, T T' are the transmitters; R R', the receivers; *ff*, the line-wires; P P, the batteries, and B B the induction-coils. A is the stage; X X, the foot-lights thereof; E E, the reflectors or screens for the foot lights; Y, the balustrade or low wall at the front edge of the stage, and H the prompter's box.

Referring to Figs. 1 and 2, the transmitters on the right of the prompter's box are lettered T T, while those on the left are lettered T'T'. Each transmitter T communicates with a receiver, R, and each transmitter T' with a receiver, R'. The bundle of wires *ff* from the theater extends into the street, and the wires are carried from it into the houses of the several subscribers, two circuits leading to each house, as indicated in Fig. 2, where a single line, *f*, designates the two wires of one circuit.

The batteries P P, inductoriums B B, and other accessories are arranged by preference beneath the stage, as shown.

In Fig. 3 the circuit-connections are shown in diagram. Each transmitter T is in a local circuit, which includes one inductorium B, and is branched into three or other number of branches, in each of which branches there is a battery, P. All but one of these branches are always kept broken at a commutator, D, a separate commutator being arranged in each branch. From the secondary of each inductorium B the two wires $f f$ of the circuit extend to the receivers R R, (here shown as connected in pairs,) and in this line-circuit is interposed an interruptor, I.

During the usual length of a theatrical or operatic performance a single battery for feeding the transmitter-circuit would become spent, so that the sounds would be transmitted continually more feebly. To avoid this disadvantage I provide for changing batteries between the acts or whenever the batteries first used in the circuits become so far spent as to impair the volume of the transmitted sound, and this shifting is accomplished by the commutators D D. The three (or other number) of series of batteries for the numerous circuits are arranged in gangs or rows, all the batteries of each gang being connected to the corresponding series of commutators. The commutators of each series for all the circuits are arranged in a separate row for simultaneous operation, so that all the circuits can be broken or closed by one movement. At the opening of the performance the branches containing the first batteries are closed, and all the other branches are broken. When it is desired to change batteries the commutators D D of the first branches are shifted to break those branches and the commutators in the second branches are shifted to close those branches.

In Figs. 7, 8, and 9 the commutators D D of one series are shown in detail. To a back board are fastened two rows of leaf-springs, $c$ $c$ and $c' c'$, arranged in pairs, a spring $c$ above each spring $c'$. One pair $c$ and $c'$ constitutes a commutator for one circuit.

F is a bar of insulating material, held in slotted bearings G G at the ends and extending through between the rows of springs. When this bar is pulled forward it separates all the upper from all the lower springs, thereby breaking all the circuits; but when it is moved back it is clear of the springs, and the latter press together and close the circuits. The bar F has hooks $g g$ at its ends, by which it may be moved and retained in either position. As the changing of the batteries will produce interruptions of the current, which would be transformed into loud and abrupt sounds in the receiver, I provide for breaking all the line-circuits during the act of changing the batteries, thus cutting off all sounds from the receivers. This I accomplish by an interruptor, I, Figs. 3 and 10, which is constructed and operated in the same manner as the commutators D. By an obvious change the interruptor can be made to shortcircuit the lines instead of breaking them.

The transmitters may be arranged in many different positions at or near the front of the stage, as indicated in Figs. 1, 2, 5, 6, 14, and 15. In Figs. 1 and 2 they are set on the floor of the stage just in front of the lights and back of the balustrade. In Fig. 5 they are shown in two positions, both just underneath the floor, with openings therein for the passage of the sound. One is between the light and the balustrade, the other back of the light. The latter rests on a little shelf fixed just beneath the floor, and the sound-opening in the floor is covered with stout wire-cloth or a grating of metal bars, $b$. In Fig. 6 are shown four different positions, one transmitter being fixed to the front side of the balustrade, another to the front of the reflector E near its top, another to the front thereof just beneath the floor, and another to the bottom of the reflector. There is a sound-opening through the supporting part, communicating with each transmitter, as shown, through which the sound enters, as indicated by the arrows.

As it is desirable to connect as many subscribers as possible with the theater, the greatest possible number of transmitters should be assembled together in proximity to the actors or singers. The methods already described may in some instances bring together an insufficient number of transmitters, in which case I employ the method shown in Figs. 14 and 15. I make two long slots, S S', in the floor of the stage, extending close to the foot-lights, to each side of the prompter's box, and crossed by slats of wood or metal, as indicated in Fig. 15. Beneath these slots are placed two elongated boxes, K, one of which is shown in cross-section in Fig. 14, and in these boxes K the transmitters are placed, being arranged in tiers on opposite sides thereof, having a central sound-space below the slot S. The transmitters are fastened to the sides of the box, the intermediate ones being arranged in pairs, back to back, so that every alternate one is inverted, and between each such pair a sound-space is left. Only four transmitters are shown on each side in Fig. 14, so that only one is inverted; but the box may be made large enough to accommodate a greater number. A transmitter may be set on the bottom of the box at the center, between the two vertical side tiers, and others may be arranged above this, if the space be sufficient. The sound enters at the opening S and passes to the transmitters, as indicated by the arrows. It is desirable that the box K should open from below, in order that its contained transmitters may be made accessible. Two or more slots S may be arranged parallel with each other, instead of one, with a series of transmitters beneath each slot.

It is highly important that the transmitters shall not be affected by the jarrings and vibrations of the stage caused by the movements of the actors, ballet-dancing, mechanical operations, and other causes, as thereby sounds would be transmitted of a very distressing character. To prevent this I mount the transmitter on a base which is filled or lined with lead, as shown at C in Fig. 4, which, being an inert substance, absorbs the vibrations and does not transmit them to the transmitter, and I support this base on legs or cushions $a\ a$ of rubber. In Fig. 14 the box K is supported by rubber suspenders J J. The rubber, being non-vibratory, also absorbs the vibrations.

I provide each subscriber with a means for locking the sounds out of his receivers at such times as he does not wish to have them used or meddled with. This consists of a cutting-out box, M. (Shown in Figs. 11, 12, and 13.) Through this box pass all the wires leading into the subscriber's house, and within the box are a series of springs, $d\ d$, and brackets $e\ e$, one for each line-circuit entering the house. The wire entering the box on one side terminates in a spring, $d$, and the corresponding wire leaving the box on the other side terminates in the corresponding bracket, $e$. The springs tend to fly up into contact with the brackets, and do so contact when the lid L is raised, thereby completing the circuits and permitting the receivers to speak; but if it is wished to silence the receivers it is only necessary to shut down the lid and lock it, when a projection, $i$, from the lid depresses the springs $d\ d$ away from the brackets $e\ e$, thereby breaking the line-circuits. These circuits might be shortcircuited instead, if preferred, by an obvious change in the connections.

I claim as my invention—

1. The described auro-stereoscopic arrangement of telephones for theaters and the like, consisting of two telephonic transmitters at the theater, one arranged on one side of the stage and the other on the other side, with two receiving-telephones at the subscriber's house, one designed to be placed by the auditor at each ear, with a telephonic circuit connecting the transmitter at the right of the stage with the receiver for the auditor's right ear and another circuit connecting the transmitter at the left of the stage with the receiver for the auditor's left ear, combined substantially as and for the purposes set forth.

2. The combination of the stage A of a theater with a series of transmitting-telephones, T T, arranged adjacent to the foot-lights in substantially the manner set forth and shown, with circuits extending from said transmitters to the residences of the respective subscribers and there terminating each in a receiving-telephone, substantially as set forth.

3. The combination, with the stage A of a theater, of a transmitting-telephone, T, and an interposed elastic cushion or suspender, substantially as set forth.

4. The combination of the stage A of a theater, having a sound-opening in the floor thereof, and one or more transmitting-telephones, T T, arranged beneath the floor in connection with said opening, substantially as set forth.

5. The combination of the stage A of a theater having a sound-opening, S, through the floor thereof, a box, K, hung from the floor under said sound-opening by elastic suspenders, and a series of transmitting-telephones, T T, disposed in said box, substantially as set forth.

6. The combination of a series of transmitting-telephones, an equal series of inductoriums, a series of local circuits, each including one transmitter and one inductorium, and each divided into two or more branches, two or more series of batteries, one battery included in each such branch, a circuit-breaking commutator in each such branch, all the commutators of each separate series of batteries being arranged in a separate row or group, and means, substantially as described, for simultaneously operating all the commutators of either series, as and for the purposes set forth.

7. A series or gang of circuit-breaking commutators, consisting of a number of pairs of springs or strips arranged in a row, the opposite strips of each pair tending to fly together and close the circuits, with an insulating-bar arranged between the rows of strips and adapted to be moved between the contacting portions of the strips of all the pairs simultaneously, thereby separating them and breaking the circuits, combined and operating substantially as set forth.

8. A series of local transmitter battery circuits, each including the primary of a separate inductorium, a series of line-circuits, each including a receiving-telephone and the secondary of one of the inductoriums, means, substantially as described, for changing the batteries in the local circuits, and a series of short-circuiting or circuit-breaking interruptors, each interposed in one of the line-circuits, with means for simultaneously operating all of said interruptors, all combined and adapted to operate substantially as set forth.

9. The combination of a transmitter arranged in a theater or the like, local battery-circuit connecting the same with an induction-coil, a line-circuit leading from said coil to the subscriber's residence, and there terminating in a receiving-telephone, a silencing-box, M, through which at least one wire of said circuit passes, a spring, $d$, and bracket $e$, interposed in said circuit and inclosed in said box, and a projection, $i$, on the lid L, adapted, when the lid is closed, to depresss said spring, and thereby cut off the current from the receiving-telephone, substantially as set forth.

In witness whereof I have hereunto signed my name in the presence of two subscribing witnesses.

CLEMENT ADER.

Witnesses:
JULES ARMENGAUD, Jeune,
DAVID T. S. FULLER.